Figure 1:
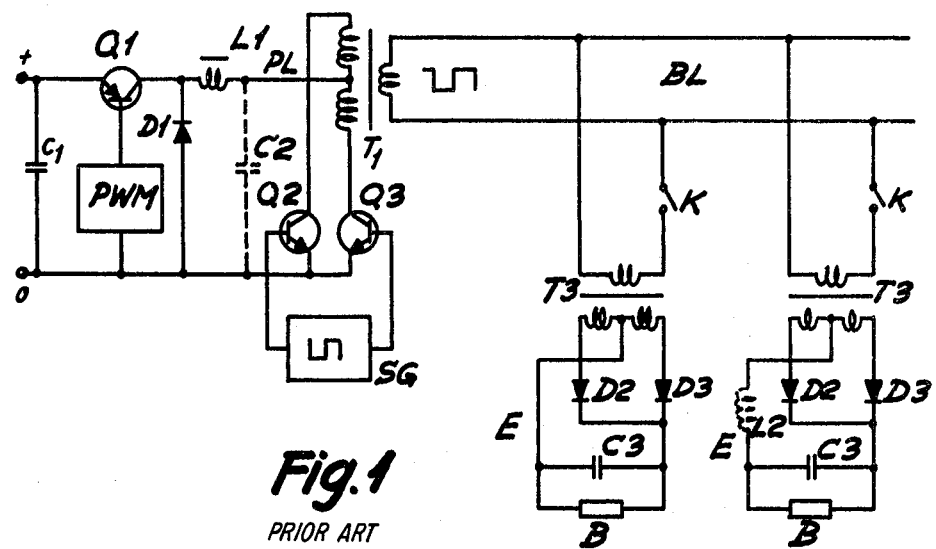

United States Patent [19]

Seiersen

[11] 4,347,560
[45] Aug. 31, 1982

[54] SQUARE WAVE GENERATOR

[75] Inventor: Ole S. Seiersen, Kokkedal, Denmark

[73] Assignee: Christian Rovsing A/S, Ballerup, Denmark

[21] Appl. No.: 245,988

[22] Filed: Mar. 20, 1981

[30] Foreign Application Priority Data

Mar. 21, 1980 [DK] Denmark .............................. 1232/80

[51] Int. Cl.³ ........................................... H02M 3/335
[52] U.S. Cl. ....................................... 363/24; 323/266
[58] Field of Search ........................... 363/22–26, 363/55–56, 95, 97, 124, 131, 133, 134; 323/266, 268–272, 285; 307/38, 42, 44, 45, 64, 72, 82–86

[56] References Cited

U.S. PATENT DOCUMENTS 3,365,657  1/1968  Webb ............................... 363/134 X
3,369,195  2/1968  Zollinger et al. ............... 363/133 X
3,638,100  1/1972  Centala et al. ...................... 363/133
4,035,710  7/1977  Joyce .............................. 323/266 X
4,065,713  12/1977  Pollmeier .......................... 363/23 X Primary Examiner—William M. Shoop
Assistant Examiner—Peter S. Wong
Attorney, Agent, or Firm—Fleit & Jacobson

[57] ABSTRACT

In a square wave generator for the supply of power to a plurality of electric units the advantages of current controlled and voltage controlled generators may be combined by the provision of two output transformers (T1 and T2) whose primary windings are connected in parallel through diodes (D5 and D6), which in case of overloading are blocked by the voltage of a capacitor which itself is connected through a diode which is also blocked by said voltage.

1 Claim, 3 Drawing Figures

SQUARE WAVE GENERATOR

Significant advantages may be obtained in many power supply systems by replacing the conventional 50, 60 or 400 Hz sine systems by a square voltage of a higher frequency, e.g. 20 kHz. One reason is that the high frequency allows very small ferrite transformers to be used, another is that full wave rectification of the square wave form in the units to be supplied with current results in a direct current whose superimposed ripple current is quite negligible.

A power supply generator may either be current controlled and supply all its energy through an inductance or be voltage controlled and have a capacitor connected across the output terminals. The two types have their separate advantages and disadvantages which will be explained in greater detail below.

The invention relates to a square wave generator for the supply of power to one or more units which may be connected to a busline, said generator having a source of current which through an inductance applies a pulsating direct current to a centre tap of primary winding of a transformer through one of two direct current conductors, the ends of said primary winding being connected to the other direct current conductor through their respective alternately conductive static switches. The object of the invention is to provide such a generator that combines the advantages of said two types of generators and eliminate their drawbacks.

This object is achieved in that the generator comprises a second output transformer whose primary winding is connected in parallel to the primary winding of the first output transformer through diodes and has a centre tap which is connected to the direct current conductors through a diode and a capacitor, respectively, the secondary windings of the two transformers being connected in series in the busline.

Figure 2:
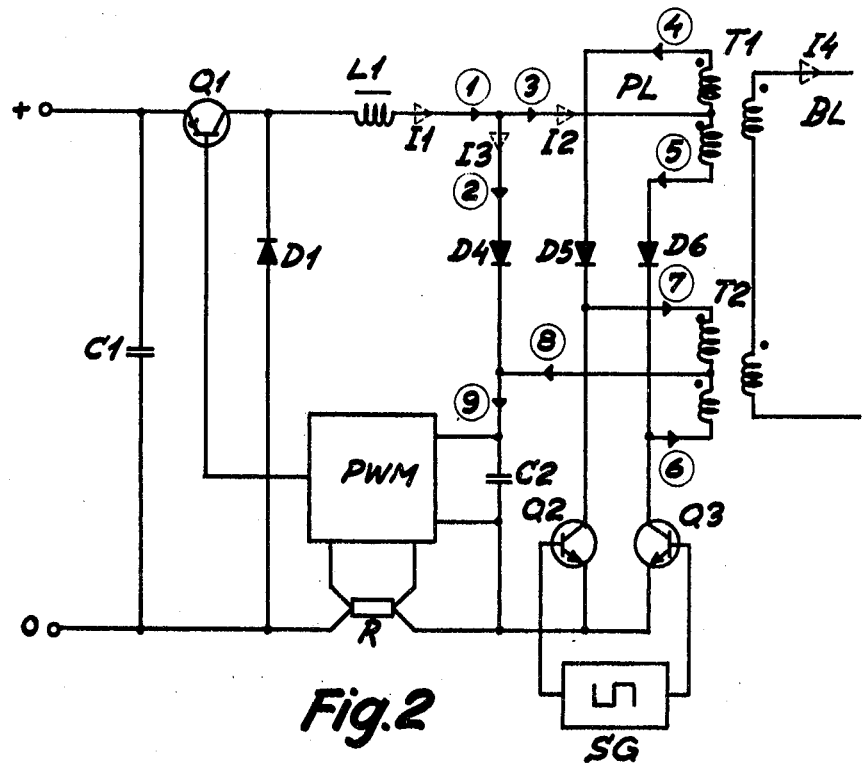
Figure 3:
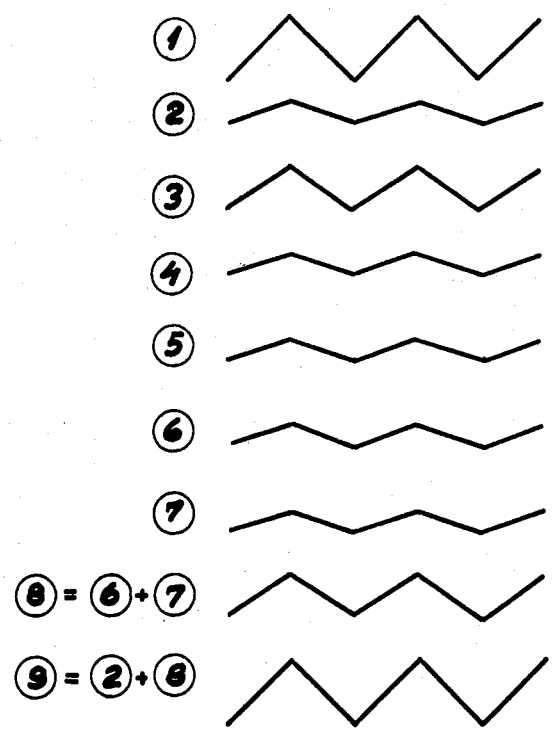

The invention will be described more fully below with reference to the drawing, in which FIG. 1 is a diagram of a known square wave generator that feeds a busline to which current consuming units may be connected, FIG. 2 is a diagram of an embodiment of the generator of the invention, and FIG. 3 is a graphical view showing the ripply current at various points in the generator.

The generator shown in FIG. 1 is fed with a direct voltage to its input terminals marked + and 0 which are shunted by a capacitor C1. The positive terminal is connected to the emitter in a transistor Q1 whose collector is connected to the centre of the primary winding of an output transformer T1 through a self induction coil L1 and a positive conductor PL. The base of the transistor Q1 is fed with a control voltage from a pulse width modulator PWM which is also connected to the zero conductor. The zero conductor and the end of the coil L1 facing the transistor Q1 have connected between them a diode D1 with its cathode facing the coil. The ends of the primary winding of the transformer T1 are connected to the zero conductor through their respective transistors Q2 and Q3 whose bases are controlled by a symmetrical square wave generator SG such that one transistor is conductive when the other is non-conductive, and vice versa.

The secondary winding of the output transformer T1 applies a symmetrical square voltage to a busline BL which has connected to it a plurality of units E that each consist of a transformer T3, a full wave rectifier D2, D3, a charging capacitor C3 and a device that is represented by a load B and can be connected by means of a switch K, which may e.g. be a make contact of a not shown relay.

The pulse width modulator PWM produces square pulses whose widths are controlled in a known, not shown manner by the voltage of the positive conductor PL. These pulses are fed to the base of the transistor Q1 and make it conductive. In the conductive periods current flows through the coil L1 and alternately through one and the other half of the primary winding of the output transformer T1 so that the symmetrical square voltage, previously mentioned, is induced in the secondary winding of the transformer. At the same time energy is stored in the coil L1, and this energy or part of it is discharged into the output transformer through the diode D1 in the non-conductive periods. By varying the pulse width on the transistor base in response to the voltage of the positive conductor PL, the pulse width modulator PWM tends to regulate the flow of current in the transistor Q1 so as to keep this voltage constant. Besides being controlled by the output direct voltage the pulse width modulator PWM may also be designed to sense the current and, in case of overloading, to maintain it at a constant maximum value.

The generator described in the foregoing is current controlled. When a contact K is closed for the connection of a unit E, the unit E acts as a momentary short-circuit because of the charging capacitor C3. However, the coil L1 of the generator restricts the current to a value that is not detrimental to the relay contact K. The short-circuit results in the disappearance of the alternating voltage from the other units E which must therefore have large charging capacitors to maintain the voltage over the load B. When connected, the large capacitors require a long charging time during which they remove the alternating voltage from the other units.

When units are disconnected the alternating voltage in the busline BL increases owing to the energy ($\frac{1}{2}L_1I^2$, where L is the self induction of the coil and I the current through it) stored in the coil L1 if a certain minimum load is not constantly present.

When the generator, as shown in dashed lines, is supplemented with a capacitor C2 connected between the positive conductor PL and the zero conductor, it becomes voltage controlled and will then be capable of supplying an almost unlimited current when units E are connected, which involves a great risk of a so-called second break-down in the transistors Q2 and Q3 resulting in a rapid destruction of these transistors. An advantage of the voltage controlled generator is that the ripple current produced flows in the capacitor C2 and not in the units E. Moreover, this capacitor can absorb energy from the coil L1 in case of all the units E being disconnected at the same time. Another advantage is that the presence of the capacitor C2 makes it possible to provide the rectifier circuits of the units E with a series coil L2 that is shown in dashed lines in one unit and which can maintain the current in the charging capacitor C3 in the dead period when the conductive state is changed from the diode D2 or D3 to the other. This allows the use of small charging capacitors which are charged quickly.

FIG. 2 shows a generator of the invention where the same references are used as in the FIG. 1 for the same parts. In the circuit shown in FIG. 2 a diode D4 having its anode facing the capacitor C2 is inserted between the capacitor C2 and the positive conductor PLV. Moreover, diodes D5 and D6, respectively, having their anodes facing the transistors Q2 and Q3 are inserted in the connections between the ends of the primary winding of the output transformer T1 and the transistors Q2 and Q3. The primary winding of the transformer T1 is connected in parallel through these diodes to the primary winding of a second output transformer T2, whose secondary winding is connected in series with the secondary winding of the first transformer in the busline BL. A centre tap on the primary winding of T2 is connected to the junction between the diode D4 and the capacitor C2. The capacitor C2 is moreover connected across a control input to the pulse width modulator PWM, which also has a current sensing control input across which a series resistor R, which is inserted in the zero conductor, is connected.

In normal working conditions the diodes D4, D5, and D6 are all conductive, and the circuit then functions as a voltage controlled generator with ensuing advantages. Thus, the capacitor C2 can absorb the energy from the self induction coil L1 when a change is made from full load to no load so that overvoltage on the busline B1 can be eliminated. FIG. 3 is a graphical view of the ripple currents at the points marked 1-9 in the circuit; the directions of these currents are indicated by small arrows in full lines on the leads concerned. It will be seen that the whole of the original ripple current at ①  runs in the capacitor C2 whose ripple current is indicated by ⑨ .

If the generator is instantaneously overloaded, the diode D4 is blocked together with that of the two diodes D5 and D6 which at the time concerned is present in the non-conducting transistor branch, resulting in the generator becoming current controlled. In this state the circuit may be considered a current generator in series with a voltage generator where it is the current generator that determines the current.

The arrows shown in dashed lines in FIG. 2 indicate operating currents I1, I2, I3 and I4. Supposing that the output transformers T1 and T2 e.g. have a ratio of 1:2 and 1:1 respectively, then in normal working conditions $$I2 = 2/1 \cdot I4, \quad I3 = 1/1 \cdot I4$$

and $$I1 = I2 + I3 = 3 \cdot I4.$$

Let e.g I1=3A, then I4=⅓·3A=1A. Hence in case of sudden overloading $$I3 = 0, \quad I1 = I2 \text{ and } I4 = \tfrac{1}{2} \cdot I2,$$

and now $$I4 = \tfrac{1}{2} \cdot 3A = 1 \cdot 5A \text{ for } I1 = 3A.$$

Thus, when suddenly overloaded the generator is capable of supplying an increased current which contributes to rapid charging of the charging capacitors of the load units, and the charging capacitors can be decreased in size because a coil may be inserted in the rectifier circuits of the units as shown in dashed lines in FIG. 1.

There is ample scope of modifying details in the shown and described construction. For example, the switching transistor Q1 may be automatically controlled in other ways than by a pulse width modulator.

What is claimed is:

1. A square wave generator for the supply of power to at least one unit which is selectively connectable to a busline, said generator having a source of current which through an inductance applies a pulsating direct current to a center tap of a primary winding of a transformer through one of two direct current conductors, said primary winding having ends connected to the other of said two direct current conductors through respective alternately conductive static switches thereof, wherein the generator comprises a second output transformer having a primary winding connected in parallel to the primary winding of the first output transformer through diodes and having a center tap which is connected to the direct current conductors through a diode and a capacitor, respectively, the secondary windings of the two transformers being connected in series in the busline.

* * * * *